United States Patent
Abreu Calfa et al.

(10) Patent No.: US 11,885,767 B2
(45) Date of Patent: Jan. 30, 2024

(54) AUTOMATED SCAN DATA QUALITY ASSESSMENT IN ULTRASONIC TESTING

(71) Applicant: Raytheon Technologies Corporation, Farmington, CT (US)

(72) Inventors: Bruno Abreu Calfa, Vernon, CT (US); Mahmoud El Chamie, Rocky Hill, CT (US); Amit Surana, Newington, CT (US); Ozgur Erdinc, Mansfield, CT (US)

(73) Assignee: RTX Corporation, Farmington, CT (US)

( * ) Notice: Subject to any disclaimer, the term of this patent is extended or adjusted under 35 U.S.C. 154(b) by 206 days.

(21) Appl. No.: 17/352,957

(22) Filed: Jun. 21, 2021

(65) Prior Publication Data
US 2022/0404317 A1 Dec. 22, 2022

(51) Int. Cl.
*G01N 29/04* (2006.01)
*G01N 29/34* (2006.01)
*G01N 29/44* (2006.01)

(52) U.S. Cl.
CPC ......... *G01N 29/048* (2013.01); *G01N 29/043* (2013.01); *G01N 29/343* (2013.01); *G01N 29/4445* (2013.01); *G01N 29/4481* (2013.01); *G01N 2291/102* (2013.01)

(58) Field of Classification Search
CPC .. G01N 29/048; G01N 29/043; G01N 29/343; G01N 29/4445; G01N 29/4481; G01N 29/0645; G01N 29/07; G01N 29/11; G01N 29/28; G01N 2291/102; G01N 2291/044
See application file for complete search history.

(56) References Cited

U.S. PATENT DOCUMENTS

| | | | |
|---|---|---|---|
| 3,228,234 | A | 1/1966 | Marklein |
| 4,805,459 | A | 2/1989 | Ferreira |
| 5,445,029 | A | 8/1995 | Alsetti et al. |
| 7,966,860 | B2 | 6/2011 | Dijkstra |
| 8,714,018 | B2 | 5/2014 | Oberdoerfer et al. |
| 9,482,645 | B2 | 11/2016 | Freda et al. |
| 10,875,125 | B2 | 12/2020 | Narayanan et al. |
| 10,928,362 | B2 | 2/2021 | Finn et al. |

(Continued)

OTHER PUBLICATIONS

Matz et al. "Classification of Ultrasonic Signals". Oct. 2006. International Journal of Materials and Product Technology. vol. 27. Issue 3. pp. 145-155.

(Continued)

*Primary Examiner* — Suman K Nath
(74) *Attorney, Agent, or Firm* — Bachman & LaPointe, P.C.

(57) ABSTRACT

A system comprising a computer readable storage device readable by the system, tangibly embodying a program having a set of instructions executable by the system to perform the following steps for detecting a sub-surface defect, the set of instructions comprising an instruction to receive scan data for a part from a transducer; an instruction to collect the scan data; an instruction to determine an indication in the scan data that indicates a distractor, wherein the indication is based on a learning phase module and an inference phase module that the processor uses to self-assess the indication; and an instruction to create a defect indication report.

20 Claims, 3 Drawing Sheets

(56) References Cited

U.S. PATENT DOCUMENTS

2003/0234239 A1   12/2003  Lee et al.
2017/0032281 A1    2/2017  Hsu
2018/0043285 A1    2/2018  Gagnon et al.
2021/0018470 A1*  1/2021  Na ..................... G01N 29/346

OTHER PUBLICATIONS

Guo et al. "Fully Convolutional Neural Network With GRU for 3D Braided Composite Material Flaw Detection". Oct. 2019. IEEE Access. vol. 7. pp. 151180-151188.
Ye et al. "Computerized Ultrasonic Imaging Inspection: From Shallow to Deep Learning". Oct. 2018. Sensors. vol. 7. Issue 11. pp. 3820.
Virkkunen et al. "Augmented Ultrasonic Data for Machine Learning". Journal of Nondestructive Evaluation, vol. 40, No. 4, Jan. 2021, https://doi.org/10.1007/s10921-020-00739-5.
European Search Report and Written Opinion dated Jan. 2, 2023 issued in corresponding EP Application No. 22180241.6.

* cited by examiner

AUTOMATED SCAN DATA QUALITY ASSESSMENT IN ULTRASONIC TESTING

BACKGROUND

The present disclosure is directed to the improved process for assessing the quality scan data for the automatic inspection of engine parts using immersion pulse-echo inspection technology.

Aerospace engine components, may incur defects or imperfections during the manufacturing process. Non-destructive testing (NDT) inspections are performed during different stages of the manufacturing process to identify defective parts. Inspection methods include, but are not limited to, visual inspection, X-Ray, thermography, and ultrasonic testing. It is particularly difficult to inspect components that have an internal structure using only external observations. Forms of flaws such as porosity and inclusions in metallic parts are particularly difficult to detect. These types of defects can grow and damage the part in service. Such internal defects are often detected by some form of excitation of the structure (ultrasonic, thermoacoustic, and the like), sensing of the excitation, and manual interpretation of the sensor signals, see for example FIG. 1. This manual inspection process is tedious, time consuming, and error prone.

What is needed is a mechanism that can identify scan data distractors with high accuracy, thus being successful at classifying indications as actual part defects.

SUMMARY

In accordance with the present disclosure, there is provided a system for detecting a sub-surface defect comprising a transducer fluidly coupled to a part located in a tank containing a liquid configured to transmit ultrasonic energy, the transducer configured to scan the part to create scan data of the scanned part; a pulser/receiver coupled to the transducer configured to receive and transmit the scan data; a processor coupled to the pulser/receiver, the processor configured to communicate with the pulser/receiver and collect the scan data; and the processor configured to detect the sub-surface defect; a tangible, non-transitory memory configured to communicate with the processor, the tangible, non-transitory memory having instructions stored therein that, in response to execution by the processor, cause the processor to perform operations comprising receiving, by the processor, the scan data for the part from the transducer; collecting, by the processor, the scan data; determining, by the processor, a defect indication in the scan data that indicates a distractor, wherein the indication is based on a learning phase module and an inference phase module that the processor uses to self-assess the indication; and creating, by the processor, a defect indication report.

A further embodiment of any of the foregoing embodiments may additionally and/or alternatively include the scan comprises transmitting ultrasonic energy to the part and receiving the ultrasonic energy from the part.

A further embodiment of any of the foregoing embodiments may additionally and/or alternatively include the distractor comprises at least one of a bubble, a floater, a surface condition, or a defect.

A further embodiment of any of the foregoing embodiments may additionally and/or alternatively include the system further comprises determining, by the processor, a defect characteristic including at least one of a defect size, a defect location, and a defect type.

A further embodiment of any of the foregoing embodiments may additionally and/or alternatively include the system further comprises verifying, by the processor, that the indication is cleared and dimensioning the indication.

A further embodiment of any of the foregoing embodiments may additionally and/or alternatively include the system further comprises providing, by the processor, an A-scan pre-processing function utilizing the learning phase module and the inference phase module.

A further embodiment of any of the foregoing embodiments may additionally and/or alternatively include the system further comprises providing, by the processor, a disposition of one of an indication being a defect or an indication being a distractor.

In accordance with the present disclosure, there is provided a system comprising a computer readable storage device readable by the system, tangibly embodying a program having a set of instructions executable by the system to perform the following steps for detecting a sub-surface defect, the set of instructions comprising an instruction to receive scan data for a part from a transducer; an instruction to collect the scan data; an instruction to determine an indication in the scan data that indicates a distractor, wherein the indication is based on a learning phase module and an inference phase module that the processor uses to self-assess the indication; an instruction for automated decision making to take corrective action if the indication is a distractor; and an instruction to create a defect indication report.

A further embodiment of any of the foregoing embodiments may additionally and/or alternatively include the scan data is selected from at least one of C-scans and A-scans.

A further embodiment of any of the foregoing embodiments may additionally and/or alternatively include determining the indication in the scan data utilizes a temporal ML model trained using previously and newly obtained A-scans in the learning phase module for classifying the distractor.

A further embodiment of any of the foregoing embodiments may additionally and/or alternatively include the step of determining an indication in the scan data that indicates a distractor is responsive to neural network-based approaches including sequence or LSTM auto encoders, and generative adversarial networks.

A further embodiment of any of the foregoing embodiments may additionally and/or alternatively include the system further comprises an instruction to classify each the distractor indication; and an instruction to determine if a rescan is required.

A further embodiment of any of the foregoing embodiments may additionally and/or alternatively include the system further comprises an instruction to alert an inspector responsive to the nature and severity of the distractor; or an instruction to request a rescan of the part.

In accordance with the present disclosure, there is provided a process for detecting a sub-surface defect by use of a system including a transducer fluidly coupled to a part located in a tank containing a liquid configured to transmit ultrasonic energy, the transducer configured to scan the part to create scan data of the scanned part; a pulser/receiver coupled to the transducer configured to receive and transmit the scan data; a processor coupled to the pulser/receiver, the processor configured to communicate with the pulser/receiver and collect the scan data; and the processor configured to detect the sub-surface defect, a tangible, non-transitory memory configured to communicate with the processor, the tangible, non-transitory memory having instructions stored therein that, in response to execution by the processor, cause the processor to perform operations comprising receiving, by the processor, the scan data for the part from the transducer, wherein the scan data comprises at least one of C-scan data and A-scan data; collecting, by the processor, the scan data; determining, by the processor, a defect indication in the scan data that indicates a distractor, wherein the indication is based on a learning phase module and an inference phase module that the processor uses to self-assess the defect indication; and creating, by the processor, a defect indication report.

A further embodiment of any of the foregoing embodiments may additionally and/or alternatively include the process further comprising classifying by the processor, each the distractor indication; and determining by the processor, if a rescan is required.

A further embodiment of any of the foregoing embodiments may additionally and/or alternatively include the process further comprising analyzing, by the processor, an A-scan associated with the indication as additional scan data to identify quality issues in the scan data.

A further embodiment of any of the foregoing embodiments may additionally and/or alternatively include the process further comprising alerting by the processor, an inspector responsive to the nature and severity of the distractor; or requesting by the processor, a rescan of the part.

A further embodiment of any of the foregoing embodiments may additionally and/or alternatively includethe step of determining an indication in the scan data that indicates a distractor is responsive to data augmentation techniques comprises at least one of shifting, scaling, locally added noise, and neural network-based approaches including sequence or LSTM auto encoders, and generative adversarial networks.

A further embodiment of any of the foregoing embodiments may additionally and/or alternatively include determining the indication in the scan data utilizes a temporal ML model trained using previously and newly obtained A-scans in the learning phase module for classifying the distractor.

A further embodiment of any of the foregoing embodiments may additionally and/or alternatively include the process further comprising providing, by the processor, a disposition of one of an indication being a defect or an indication being a distractor.

Other details of the process are set forth in the following detailed description and the accompanying drawings wherein like reference numerals depict like elements.

DETAILED DESCRIPTION

Figure 1:
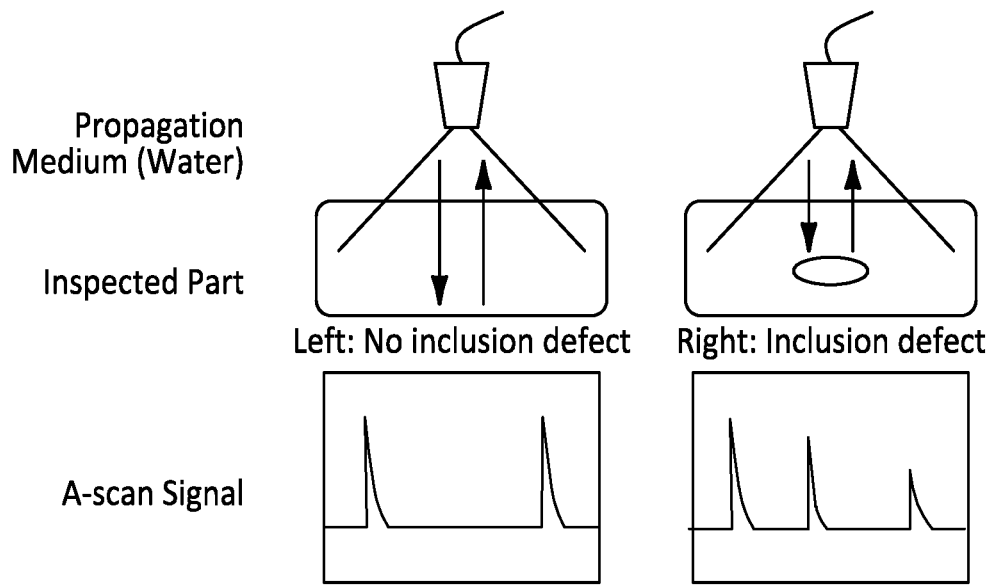
FIG. 1 is a schematic of an exemplary manual inspection system.
Figure 2:
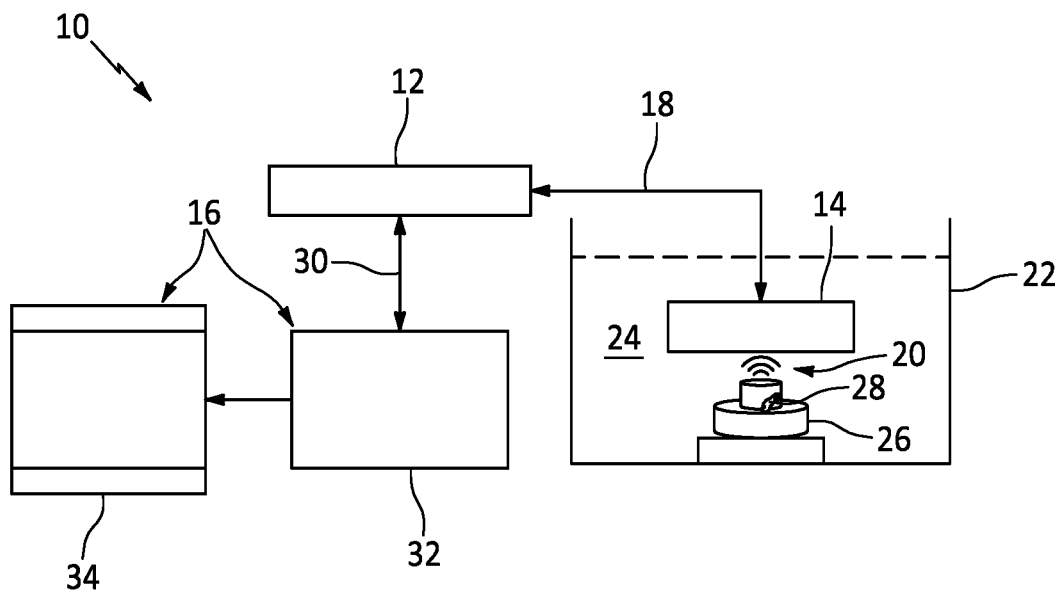
FIG. 2 is a schematic of an exemplary ultrasonic testing inspection system.

Referring now to FIG. 2, the exemplary ultrasonic testing (UT) inspection system 10 is shown. The UT inspection system 10 includes several functional units, such as a pulser/receiver 12, transducer 14, and display devices 16. A pulser/receiver 12 is an electronic device that can produce high voltage electrical pulses 18. Driven by the pulser 12, the transducer 14 generates high frequency ultrasonic energy (sound energy) 20. The sound energy 20 is introduced and propagates in the form of waves through a liquid coupling medium materials 24 in the UT tank 22, such as water, and the part being inspected 26, like an engine disk. When there is a discontinuity 28 in the part 26, such as a crack, located in the wave path, a portion of the energy 20 will be reflected back from the discontinuity (indication) 28 surface. The transducer 14 can detect the reflected energy wave. The reflected wave signal is transformed into scan data 30 relayed in the form of an electrical signal 18 by the transducer 14 and relayed to a first processor 32 and displayed on a screen 16 (Computer 1 in FIG. 2). A second processor 34 (Computer 2 in FIG. 2) is configured to automatically analyze the scan data 30 to distinguish between actual part defects and spurious indications of defects.

Figure 3:
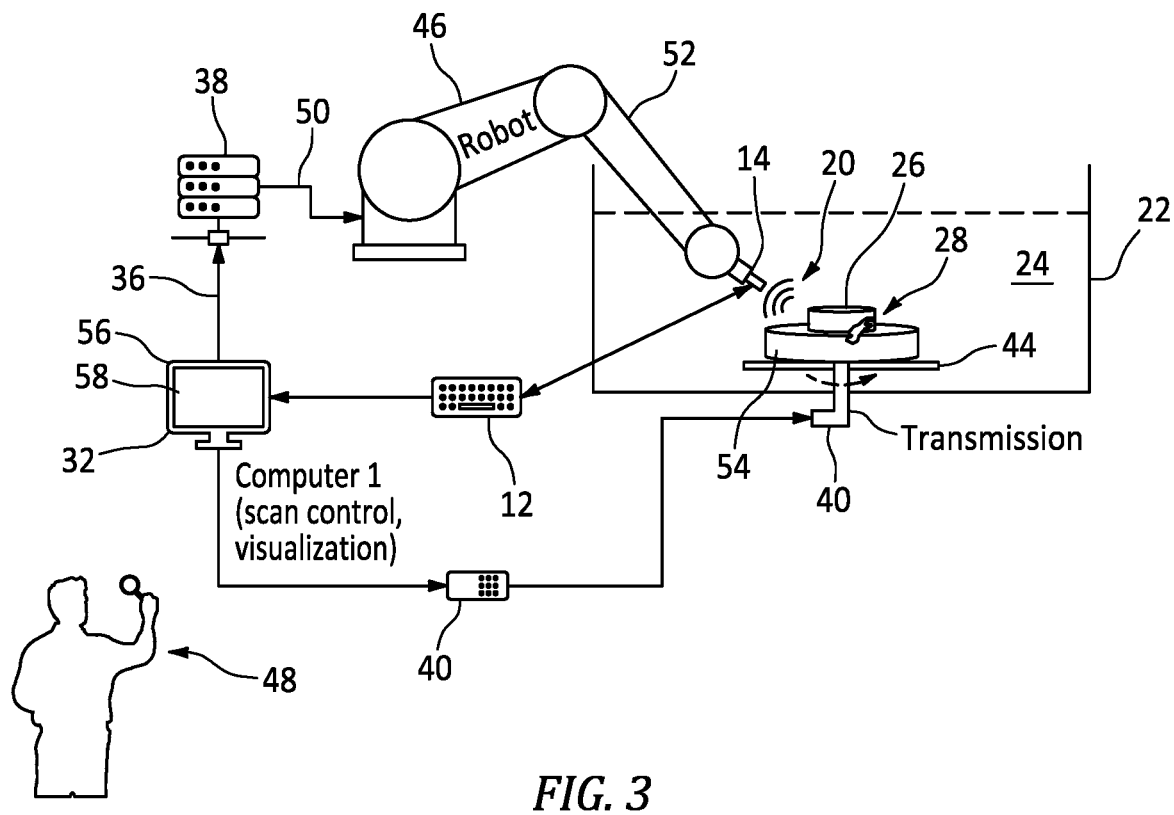
FIG. 3 is a schematic of an exemplary ultrasonic testing inspection system.

A more detailed schematic of the interactions between first processor 32 and the UT tank 22 is shown in FIG. 3. The first processor 32 is responsible for multiple functions. One of those functions includes sending scan plan information 36 to a robot controller 38. The first processor 32 can communicate with a motor controller 40. The motor controller 40 is configured to operate a motor 42 to rotate a turntable 44 supporting the inspected part 26. The first processor 32 can also receive scan signal data 30 from the pulser/receiver 12 received from the transducer 14 coupled to a robot 46 to be displayed for review by an inspector 48.

The scan plan 36 contains instructions 50 for moving a robotic arm 52 and positioning the transducer 14 around the inspected part 26 for collection of scan data 30. The data 30 can be collected by scanning every surface 54 of the part 26 until the totality of surfaces 54 of the part 26 that cover the entirety of the part 26 volume have been scanned. In order to generate a scan plan 36, the inspector 48 configures the scan by setting parameters 56 in a UT tank vendor software 58 installed on the first processor 32. The values of such parameters 56 depend on the inspected part 26; some parameters 56 and their representative values include water path length, that is, the distance between the tip of the transducer 14 and the inspected part 26 of for example, 100 mm.

The pulser/receiver 12 produces outgoing electrical pulses 18 to the transducer 14 and receives/amplifies returning pulses 18 from the transducer 14. The robotic arm 52 aides in the translation (spatial coordinates) and angulation (tilting) of the transducer 14 according to the scan plan 36. A single transducer 14 generates and receives sound wave signals 20 that traverse the liquid medium 24 and the inspected part 26.

One of the main uses of the UT inspection system 10 is for detecting and evaluating flaws or defects in physical parts 26, such as turbine components of gas turbine engines. A defect can be defined as a region of a material or a structure that has different physical properties from its neighborhood (causing a discontinuity in that region), and those differences in properties are not intended during manufacturing. Defects can occur during manufacturing or if the physical properties are altered over time. Some examples of defects detected by ultra-sonic inspection are inclusions (e.g., non-metallic, metallic, reactive inclusions), or cracks. An indication is how those defects show up in the signals coming out from the immersion pulse-echo ultrasonic system. Not all indications detected are defects because there might be false positives, but the premise from the inspection method is that all defects conforming to NDT specifications are detected as indications. Defect identification is performed by scanning parts 26 by pulser/receiver 12, transducer 14, and display devices 32, 34. Ultrasonic data 30 of the scanned part 26 can be formatted into three presentations: A-scan, B-scan, and C-scan. The A-scan presentation is a one dimension, 1-D plot that displays the amount of received ultrasonic energy (vertical axis) as a function of time (horizontal axis). The B-scan presentation is a cross-sectional, two dimension, 2-D profile of the time-of-flight (time travel or depth) of the sound energy in the vertical axis and the linear position of the transducer 14 in the horizontal axis. Lastly, the C-scan presentation is also a 2-D plot that captures a plan-type view of the location and size of the part; plots for either relative signal amplitude or time-of-flight may be generated. Multiple presentation scans can be used together for more accurate determinations of the condition of the part 26.

Absence of indications 28 in A/B/C-scans represents a clean part 26 without defect. The existence of indications 28 can be due to two main reasons: 1) part defects or 2) distractors. Distractors 58 is a general term corresponding to any artifact which appears as a false indication/defect and includes for example, floaters (debris that cause interruption of the sound beam), electrical noise (interfering electrical currents), and surface flare (resonance between wave length of sound beam and the profile of the machining grooves). Other factors such as transducer noise, material noise, and miss alignment between transducer and part, could also impact the ultrasonic data quality and generate false alarms. Depending on the nature and degree of distractors 58, a part 26 rescan may be required. Nevertheless, manual analyses of scan data, and especially across different presentations, are tedious, time-consuming, imprecise, and error prone. Disclosed herein is a mechanism that can identify these distractors 58 with high accuracy, to be used in classifying indications as actual part defects. A system and method for assessing the quality of UT scan data, from detecting and classifying distractors to deciding the appropriate course of action to eliminate them is disclosed.

Figure 4:
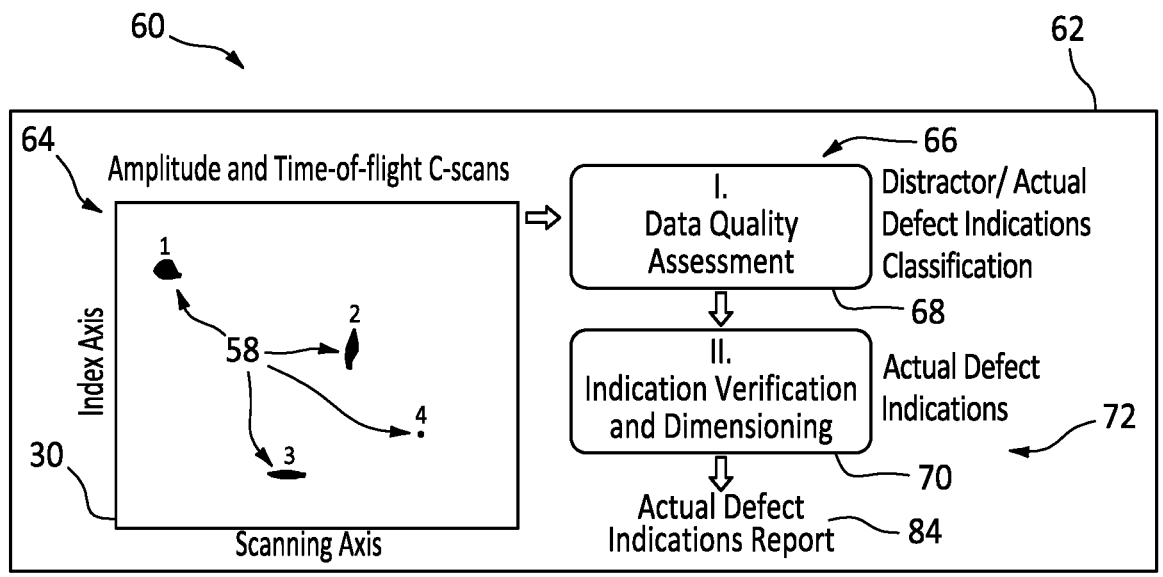
FIG. 4 is a schematic of an exemplary automatic data quality assessment of scan data.

Referring also to FIG. 4, in an exemplary embodiment of a process map is shown. The process 60 includes the use of a processor 62 which can include one or more processors 62 (e.g., computer systems having a central processing unit and memory) for recording, processing and storing the data received. The processor 62 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof.

The processor 62 can operate within the process 60 to assess the quality of UT scan data by leveraging computer vision techniques and subject matter expert criteria applied to C-scan presentations coupled with temporal machine learning (ML) models for pattern recognition of associated A-scan presentations.

The process 60 begins with the collection of scan data 30 particularly both amplitude and time-of-flight C-scans at step 64. The process 60 at 66, includes use of the processor 62 within a module I 68 that processes any indication in the scan data 30 that adheres to a subject-matter expert (SME)-defined criteria for indications 28 (for example, amplitude values above evaluation threshold). Module I 68 is the main distractor classifier to discriminate indications 28 into either distractors 58 with the correct label for example, bubble, floater, surface condition, or actual defects that are then passed to a dimensioning module II 70 to determine defect characteristics such as, the defect size, location, and type at step 72. Module II 70 serves a dual purpose of verification that the actions performed as output of the decision model in Module I 68 have cleared out the indication 28 and also allows for dimensioning of actual defect indications 28 based on such factors as size, location, and type of defect, for defect indication 58 reporting purposes at 84 as shown in FIG. 4.

Figure 5:
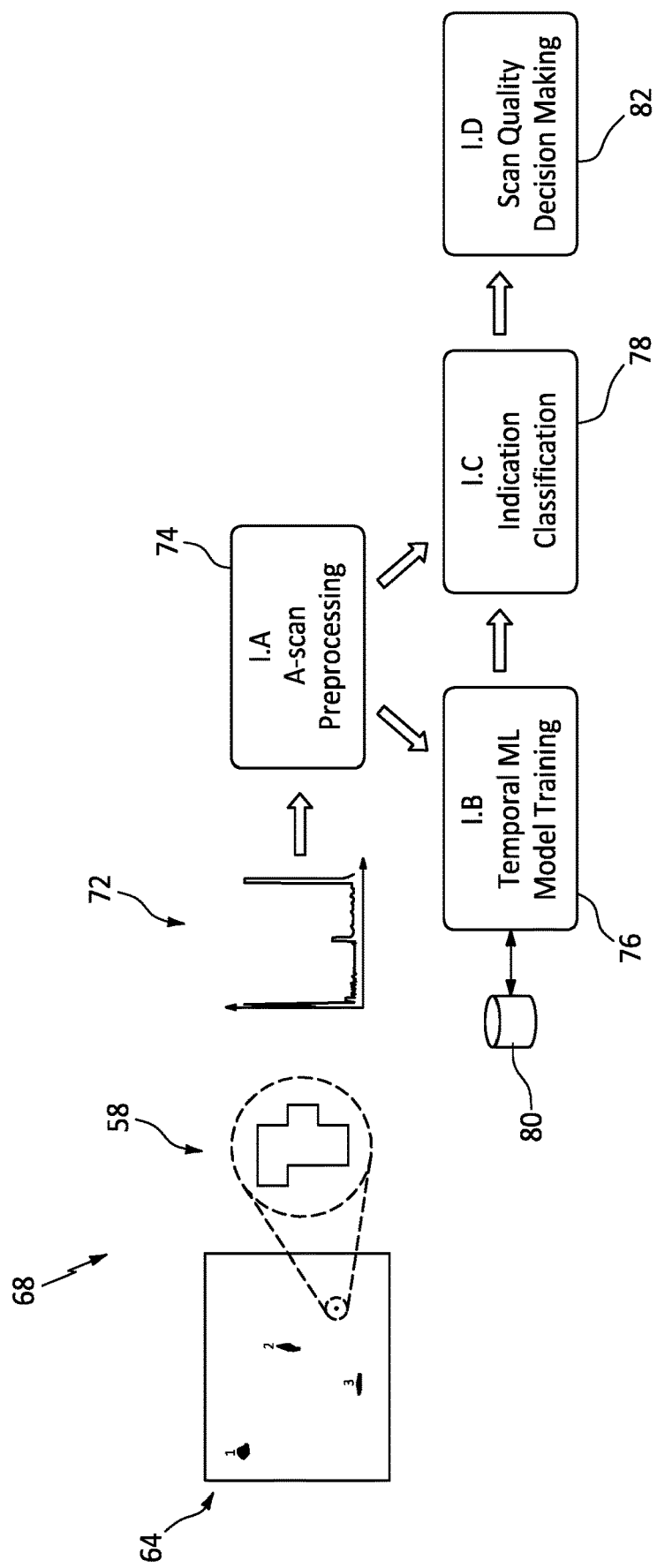
FIG. 5 is a schematic of an exemplary process diagram for a module used for scan data quality.

Referring also to FIG. 5, the schematic workflow of the process 60 shows details utilized to detect those distractors 58 in module I 68. Module I 68 includes instructions for the processor 62 to begin with the extraction of A-scan data 72 for the pixel with highest signal amplitude value in each of the detected indications 58. The next steps within module I 68 include A-scan pre-processing 74 which can support a hybrid approach to perform a learning phase at a module I.B 76 (for example, build predictive ML models), and run an inference phase at module I.C 78 (for example, predict the class of each distraction indication 58) as illustrated in FIG. 5.

During the inference phase 78, the processor 62 utilizes a temporal ML model that had been trained using previously and newly obtained A-scans in the learning phase 76 is used to classify the nature of the distraction indication 58 (for example, bubbles, floaters, electrical noise, and surface flare). Such models can be variants of deep recurrent neural networks, including long short-term memory (LSTM) and gated recurrent network (GRU). Prior to feeding A-scans to the processor 62, each A-scan signal must be pre-processed (for example, by resampling) so that all data samples in the network input layer have the similar shape.

The model learning phase in module I.B 76 is aided by data augmentation techniques to enrich a training dataset 80 and make the ML model robust by reducing the possibility of overfitting. Such techniques include shifting, scaling, locally added noise, and neural network-based approaches (for example, sequence or LSTM auto encoders, and generative adversarial networks). Once a final temporal ML model is obtained and new UT scan data are available, inference can be performed in the module I.C 78, where each distraction indication 58 is classified and a determination is made whether a rescan is required. Finally, in module I.D 82, depending on the nature and severity of the distractor indication 58, an automated decision is made to eliminate source of distractor in the ultrasonic data, for instance, to automatically remove bubble using a robotic actuator, initiate a calibration procedure to align transducer orientation w.r.t. to scanned part, request partial/full rescan, and/or alert the UT tank operator/inspector 48 with details about distractor, who can then take appropriate corrective action e.g. remove bubble/floaters or machine the part surface to remove profile of the machining grooves and eliminate surface flare.

A technical advantage of the process described is a mechanism utilized for an increased yield in part inspections with minimal human intervention.

Another technical advantage of the disclosed process can include leveraging two scan presentations, subject matter expertise, and analytics for the classification of distraction indicators.

Another technical advantage of the disclosed process can include using classification of distractors to take more informed trouble shooting actions to eliminate scan data quality issues.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for detecting a sub-surface defect comprising:
a transducer fluidly coupled to a part located in a tank containing a liquid configured to transmit ultrasonic energy, said transducer configured to scan said part to create scan data of the scanned part;
a pulser/receiver coupled to said transducer configured to receive and transmit said scan data;
a processor coupled to said pulser/receiver, said processor configured to communicate with said pulser/receiver and collect said scan data; and said processor configured to detect said sub-surface defect;
a tangible, non-transitory memory configured to communicate with said processor, the tangible, non-transitory memory having instructions stored therein that, in response to execution by the processor, cause the processor to perform operations comprising:
receiving, by the processor, said scan data for said part from said transducer;
collecting, by the processor, the scan data;
determining, by the processor, a defect indication in the scan data that indicates a distractor, wherein said indication is based on a learning phase module and an inference phase module that the processor uses to self-assess said indication; and
creating, by the processor, a defect indication report.

2. The system according to claim 1, wherein the scan comprises transmitting ultrasonic energy to said part and receiving said ultrasonic energy from said part.

3. The system according to claim 1, wherein said distractor comprises at least one of a bubble, a floater, a surface condition, or a defect.

4. The system according to claim 1, further comprising:
determining, by the processor, a defect characteristic including at least one of a defect size, a defect location, and a defect type.

5. The system according to claim 1, further comprising:
verifying, by the processor, that the indication is cleared and dimensioning the indication.

6. The system according to claim 1, further comprising:
providing, by the processor, an A-scan pre-processing function utilizing the learning phase module and the inference phase module.

7. The system according to claim 1, further comprising:
providing, by the processor, a disposition of one of an indication being a defect or an indication being the distractor.

8. A system comprising a computer readable storage device readable by the system, tangibly embodying a program having a set of instructions executable by the system to perform the following steps for detecting a sub-surface defect, the set of instructions comprising:
an instruction to receive scan data for a part from a transducer, the transducer being fluidly coupled to the part located in a tank containing a liquid configured to transmit ultrasonic energy;
an instruction to collect the scan data;
an instruction to determine an indication in the scan data that indicates a distractor, wherein said indication is based on a learning phase module and an inference phase module that the processor uses to self-assess said indication;
an instruction for automated decision making to take corrective action if the indication is the distractor; and
an instruction to create a defect indication report.

9. The system according to claim 8, wherein said scan data is selected from at least one of C-scans and A-scans.

10. The system according to claim 8, wherein determining said indication in the scan data utilizes a temporal ML model trained using previously and newly obtained A-scans in the learning phase module for classifying the distractor.

11. The system according to claim 8, wherein the step of determining an indication in the scan data that indicates a distractor is responsive to neural network-based approaches including one of a sequence or LSTM auto encoders; and generative adversarial networks.

12. The system according to claim 8, further comprising:
an instruction to classify each said distractor indication; and
an instruction to determine if a rescan is required.

13. The system according to claim 8, further comprising:
an instruction to alert an inspector responsive to the nature and severity of the distractor; or
an instruction to request a rescan of the part.

14. A process for detecting a sub-surface defect by use of a system including a transducer fluidly coupled to a part located in a tank containing a liquid configured to transmit ultrasonic energy, said transducer configured to scan said part to create scan data of the scanned part; a pulser/receiver coupled to said transducer configured to receive and transmit said scan data; a processor coupled to said pulser/receiver, said processor configured to communicate with said pulser/receiver and collect said scan data; and said processor configured to detect said sub-surface defect, a tangible, non-transitory memory configured to communicate with said processor, the tangible, non-transitory memory having instructions stored therein that, in response to execution by the processor, cause the processor to perform operations comprising:
receiving, by the processor, said scan data for said part from said transducer, wherein said scan data comprises at least one of C-scan data and A-scan data;
collecting, by the processor, the scan data;
determining, by the processor, a defect indication in the scan data that indicates a distractor, wherein said indication is based on a learning phase module and an inference phase module that the processor uses to self-assess said defect indication; and
creating, by the processor, a defect indication report.

15. The process according to claim 14, further comprising: classifying by the processor, each said distractor indication; and
determining by the processor, if a rescan is required.

16. The process according to claim 14, further comprising:
analyzing, by the processor, an A-scan associated with the indication as additional scan data to identify quality issues in the scan data.

17. The process according to claim 14, further comprising:
alerting by the processor, an inspector responsive to the nature and severity of the distractor; or
requesting by the processor, a rescan of the part.

18. The process according to claim 14, wherein the step of determining an indication in the scan data that indicates a distractor is responsive to data augmentation techniques comprises at least one of shifting, scaling, locally added noise, and neural network-based approaches including one of sequence or LSTM auto encoders, and generative adversarial networks.

19. The process according to claim 14, wherein determining said indication in the scan data utilizes a temporal ML model trained using previously and newly obtained A-scans in the learning phase module for classifying the distractor.

20. The process according to claim 14, further comprising:

provided, by the processor, a disposition of one of an indication being a defect or an indication being the distractor.

\* \* \* \* \*